United States Patent [19]

Massie

[11] 4,344,707
[45] Aug. 17, 1982

[54] MODAL SENSOR

[75] Inventor: Norbert A. Massie, Westlake Village, Calif.

[73] Assignee: Rockwell International Corporation, El Segundo, Calif.

[21] Appl. No.: 149,608

[22] Filed: May 14, 1980

[51] Int. Cl.³ .............................................. G02B 5/08
[52] U.S. Cl. .................................. 356/354; 356/121; 350/295
[58] Field of Search ....................... 356/121, 354, 371; 350/310, 295

[56] References Cited

U.S. PATENT DOCUMENTS

| 3,719,421 | 3/1973 | Poilleux et al. | 356/371 |
| 3,923,400 | 12/1975 | Hardy | 356/354 |
| 4,141,652 | 2/1979 | Feinleib | 356/121 |
| 4,239,392 | 12/1980 | Pohle | 356/354 |

OTHER PUBLICATIONS

Hardy, J. W., "Active Optics: A New Technology for the Control of Light", *Proceedings of the IEEE*, vol. 66, No. 6, (Jun. 1978), pp. 651–659 and 664–665.

*Primary Examiner*—R. A. Rosenberger
*Attorney, Agent, or Firm*—H. Fredrick Hamann; Harry B. Field

[57] ABSTRACT

Wave front distortions of a laser beam are detected by measuring the distribution of the point spread function of a focussed portion of that beam and by generating moments of that function representing tip, tilt, focus, and astigmatisms of the beam. Signals representing these moments can be used directly for correcting the distortions.

16 Claims, 15 Drawing Figures

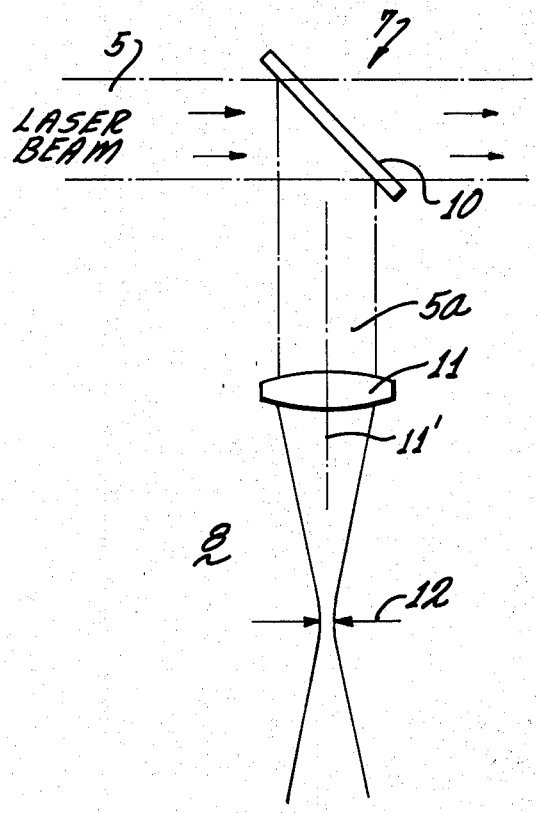
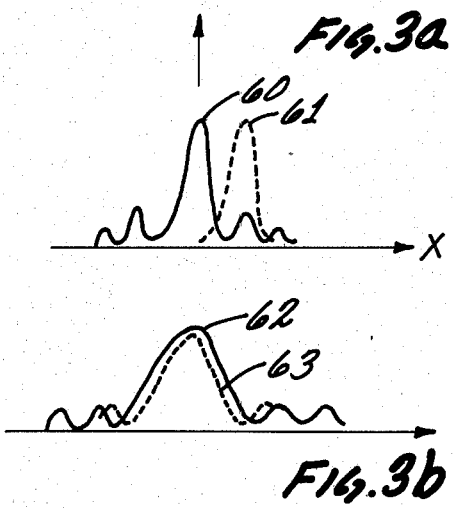
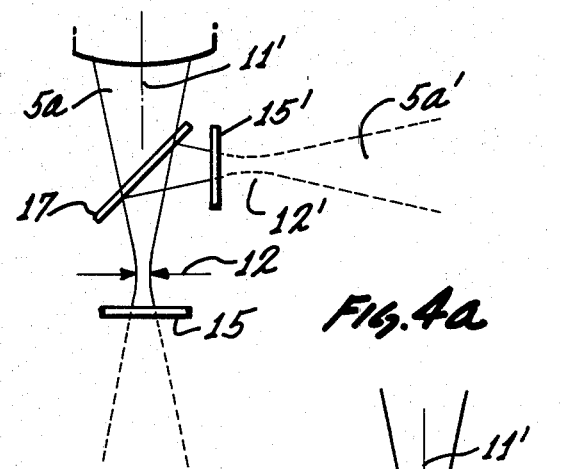
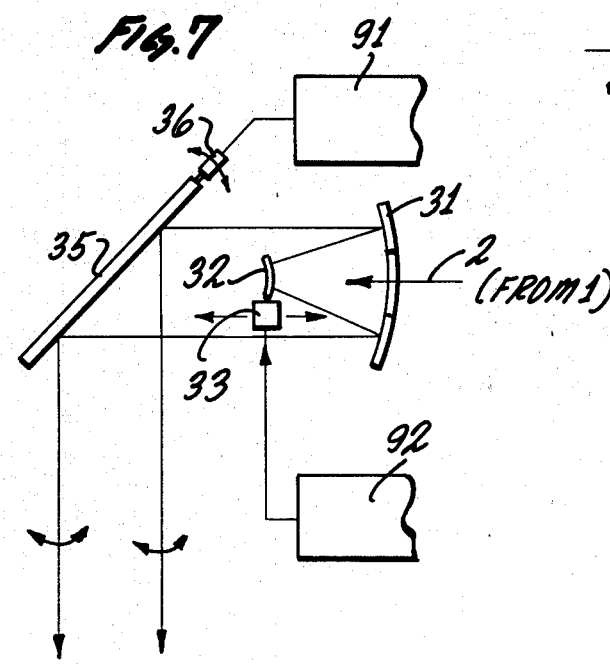
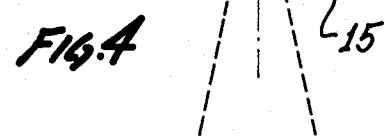

MODAL SENSOR

BACKGROUND OF THE INVENTION

The present invention relates to the control of laser beams; and more particularly, the invention relates to the detection of unwanted wave front distortions of light beams for the purposes of compensation.

Many applications of optical technology employ the principles of wave front analysis in order to acquire particular information. Wave front analysis can be applied to coherent as well as to incoherent light. Wave front analysis may be applied, for example, to where the radiation from a source is unresolved such as light emitted from a star or a star-like object. Wave front analysis can also be employed on laser beams.

Generally speaking, a laser beam as emitted has ideally equal phase in any plane extending transversely to the optical axis and direction of propagation of the beam. Such a beam may interact with an object, with another beam, or a combination thereof, and is returned, or otherwise intercepted, for the purpose of detecting any laser beam modulation, yielding information on the object with which the beam has interacted. Particularly, the interaction causes the wave front of the return beam to be modulated (in space), which modulation is also called optical path difference (or OPD, for short). If one considers any detection plane which extends transversely to the axis of the return beam, the several (complex) vectors describing the radiation in the different points in that plane oscillate no longer in phase. Detection of the phase difference yields relevant information on the object, etc., which has intercepted the beam earlier.

A problem arises if the laser beam undergoes deflections and other distortions along its transmission path, other than the desired modulation. In such cases, the wave fronts are no longer planar, even without any information modulation. Rather, distortions of the wave front are superimposed upon the desired modulation thereof, so that the detected modulation is rendered less reliable. Among such distortions, the following are, in order of importance, the most prominent ones.

There is first of all a deflection of the beam as a whole from the desired straight path. This deflection becomes noticeable as a tipping and tilting of any planar wave front relative to the optical axis in the receiving equipment because such axis assumes tilt- and tip-free wave fronts. It is customary to refer to such an inclination of the wave fronts in one direction as "tip" and an inclination in the orthogonal direction is called "tilt", whereby it is customary to assign the term "tip" to the most likely and/or most prominent deflection under the particular conditions of operation. However, these two terms could be used just to distinguish between inclinations on two orthogonal axes without preference or dominance of one over the other. Presently, it is more practical to use the terms "tip" and "tilt" without preference and to ascribe to each term a particular, fixed but arbitrarily chosen, tip or tilt axis of an x-y coordinate system.

Next in order of importance is a wave front distortion in which the center of the wave front of the beam runs ahead of or behind the more marginal portion of the front; that is to say, the wave fronts are spherically distorted, they "bulge". This type of distortion is called "focus".

A different type of distortion is called "astigmatism". The wave fronts bulge, but in different directions (convex vs. concave) in different planes. One can distinguish among the types of astigmatism, depending on the direction of those planes. There are other types of distortions; but they are clearly of a higher order and are, in effect, less noticeable in general when compared with desired wave front modulations by operation of the information as defined and to be represented by such modulation.

There is a need to detect such deflections and distortions in laser beams, particularly of the type defined above, and to eliminate them as much as possible, at least to the extent these interfering phenomena tend to falsify the desired information contained in wave front modulations. The task at hand is not so much the generation of theoretical conditions under which the distortions can be defined and eliminated. Rather, the problem is to find a practical solution which can be implemented without undue expenditures.

SUMMARY OF THE INVENTION

It is an object of the present invention to provide a new and improved method and system for detecting wave front distortions of beams of light such as laser beams and others of the type outlined above, and being unrelated to any desired modulations thereof.

It is a particular object of the present invention to provide a new and improved system which produces signals usable for online correction of the wave fronts of a laser beam, such corrections to be effective either upon emission of the laser beam, or upon receiving same.

It is a specific object of the present invention to provide a new method and system for detecting the contour of the wave front of a beam of light, or for detecting the resulting effect of wave front distortions of such a beam when received, by using a simple structure for measuring the coefficients of a ZERNICKE-type polynominal representation of these wave fronts to obtain the correction information.

It is then the specific object of the present invention to provide a new and improved system which generates these so-called "mode signals", representing directly wave front distortions such as "tilt", "tip", "focus", and the "astigmatisms", the representation being such that the signals are directly usable in a closed loop control system for providing running, on-line corrections eliminating these distortions. Also desired are signals representing various higher order aberrations such as coma, etc.

In accordance with the preferred embodiment of the present invention, it is suggested to tap a laser beam by branching off a portion thereof (possibly only a very minute portion) and directing the branched-off beam into a particular axis on which a lens or lens system is provided to focus the branched-off beam into a particular zone. The focussed beam is intercepted by an array of radiation intensity detectors, preferably a two-dimensional matrix array of detectors, to detect the distribution of the so-called point spread function of the focused beam, in or near the focal area. These detectors are individually interrogated, and the detected intensities are processed to obtain low-order moments, quite equivalent to simple statistical formulas for obtaining weighted averages and the average spread of the intensity as detected. It was specifically found that it is not required to analyze the point spread function in any great detail, particularly with respect to its contour.

Rather, the mere determination of the location of the centroid of the focused radiation, and of an indication directly representing deviation from true focusing, i.e., concentration in a single point, separately in two orthogonal directions across the detection plane, suffices to detect tip, tilt, focus, and the astigmatisms. Moreover, each one of these effects is represented by an individual quantity which, in turn, can be used to control corrections to eliminate these effects. Specifically, it was found that the moments of the point spread function taken along transverse lines in a detection plane yield directly signals which represent descriptive modes of the laser beam front, and these mode-representing signals are usable as control signals.

Any wave front, such as emitted from a laser (or as intercepted anywhere downstream), can be defined geometrically in a plane (x, y) that extends transversely to the direction of propagation. Such a function can be expressed, for example, as a polynominal of x and y. Conveniently, one can use the so-called Zernicke polynominal functions, so that the phase of the wave front is defined as a series of power functions in x and y, $$F(x,y) = 2ax + 2by + c\sqrt{3}\,(2x^2 + 2y^2 - 1) + d\,2\sqrt{6}\,xy + e\sqrt{6}\,(x-y)(x+y) + \text{higher terms}$$

Here the function is described on a unit circle.

The coefficients of these functions (a, b, c, d and e) represent directly the magnitudes of the distortions of interest, whereby a and b represent "tip" and "tilt", c represents "focus", and d and e represent two different astigmatisms. d represents astigmatism on the x and y axes, and e represents astigmatism along two orthogonal axes being tilted by 45° relative to the x and y axes. Higher-order terms and modes are usually smaller and may not be of any significance. A true planar wave front could be represented by another coefficient, the so-called "piston" value, but that coefficient has been assumed to be zero, because it does not enter into any consideration for the present purpose.

The Zernicke coefficients must be ascertained for the purpose of ascertaining a representation of any wave front distortions; and signals representing these coefficients can be used directly to introduce corrective steps for eliminating these distortions. The invention is based upon the discovery that the moments of the point-spread function, as detected, e.g., by two orthogonally arranged detector cells, represent directly the above-mentioned coefficients or modes of the polynominal decomposition; in particular, the coefficients of modes a and b are directly represented by a lateral displacement of the centroid of the point spread function; c is represented directly by a spreading of that function in width because the latter phenomenon is representative of any focal point displacement of a focused beam on account of a lack of parallelism of the rays in the beam. The coefficients of modes d and e represent the difference of beam convergence of divergence in two different orthogonal plane systems, each one including the optical axis, and represented here by different degrees of spreading in these two planes. The moments can be formed directly from the detector outputs; meaningful correction control signals are directly provided therewith. The moments of the point spread function are not linearly related to the Zernicke coefficients. However, for a certain range, linearity is an adequate approximation. Moreover, the relation is truly a monotonic one and signal processing can compensate for the non-linearities if that is desired.

It can thus be seen that the invention provides a convenient and very effective way of ascertaining parameters detecting wave front distortions, by determining particular features of the point spread function of a focussed beam. That analysis can be applied to any kind of beam whose wave fronts are from an unresolved source such as star light.

It is, therefore, an object of the present invention to provide a new and improved method for wave front analysis of beams of light which, upon being focussed, exhibit a power distribution commonly called the point-spread function.

The preferred embodiment of the invention, the objects and features of the invention, and further objects, features and advantages thereof, will be better understood from the following description taken in connection with the accompanying drawings.

DESCRIPTION OF THE DRAWINGS

FIG. 3 is a schematic representation of a portion of the system shown in FIG. 1, illustrating particularly "tapping" of a laser beam for control purposes;

FIGS. 3a and 3b are schematic representations of pointspread functions;

FIG. 4 illustrates schematically a detector array for acquiring point-spread functions near the focal area of the beam shown in FIG. 3;

FIG. 4a is a modification of the arrangement shown in FIG. 4, showing particularly a second array;

FIG. 5 is a schematic front view of one of the detector arrays shown in FIG. 4 or 4a;

FIG. 7 is a schematic illustration of corrective control for a laser beam as per FIG. 1, using the system shown in FIG. 6.

DESCRIPTION OF THE PREFERRED EMBODIMENT

Figure 1:
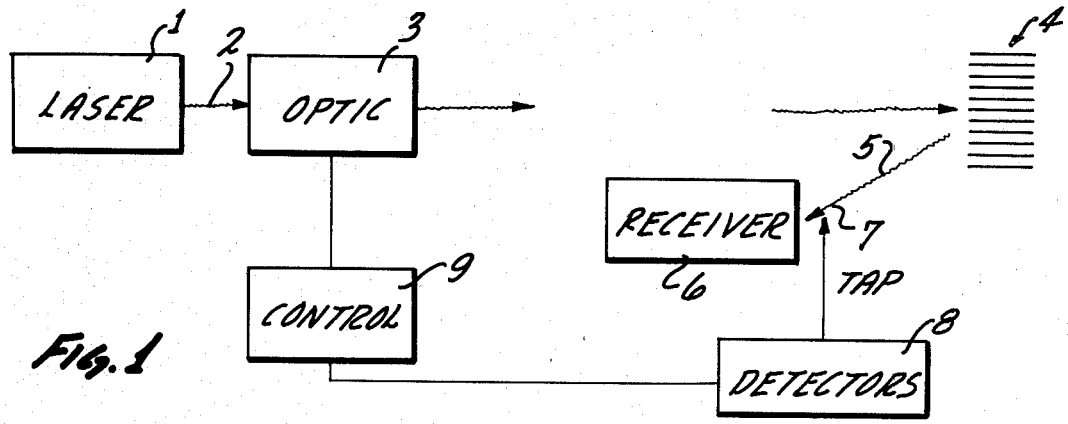
FIG. 1 is a block diagram of a system in which the invention can be practiced with advantage.

Proceeding now to the detailed description of the drawings, the overview illustrated in FIG. 1 includes a source 1 for a laser beam 2 and optical devices 3 for optically processing the outgoing beam which may interact with an object 4, or perhaps the atmosphere, or both. For the convenience of description, the interaction will be referred to as occurring with an object, though this is not meant to be restrictive in the physical sense. Interaction with several objects, or a combination of such interactions, is intended to be included. Optical processing in unit 3 may include establishing a particular phase, a particular modulation, lateral expansion of the beam to enlarge the effective area available for interaction, and others. Moreover, as will be described below, correction of the beam's geometric properties may also take place in unit 3.

Reference numeral 5 denotes the return beam to be received by a suitable device 6 provided for that purpose. Device 6 may specifically be designed to detect the local phase of the return beam in its cross section, for example, by means of measuring optical path differences (OPD) in different positions of the wave fronts as arriving in the detection plane and having resulted from the inter-action with object 4. This OPD information must be distinguished from OPD distortions of the wave front such as "tip", "tilt", "focus", etc. Device 6 is provided to detect particular information other than distortions resulting from the transmission of the laser beam over a longer distance.

The return beam 5 is intercepted at a point 7 in order to extract therefrom (tapping) a small portion of the beam for purposes of (a) determining any distortions of the beam other than through object 4, and (b) generating control signals which can be used to correct the distortions. Reference numeral 8 denotes the device used for the purpose of providing such control signals and will be described in greater detail with reference to FIG. 2.

Device 8 operates a controller 9 which acts upon optic 3 in order to eliminate the distortions of the laser beam as returned. To this end, optic 3 (see also FIG. 7) includes appropriately adjustable elements, permitting (i) changing the direction of the outgoing beam 2 and (ii) distorting a reflecting surface, or introducing a diverging or converging component into the outgoing beam 2 to, thereby, introduce local path length differences for the beam, for offsetting the effects of "tip", "tilt", "focus" and the "astigmatisms" as defined above and described more fully next.

Figure 2A:
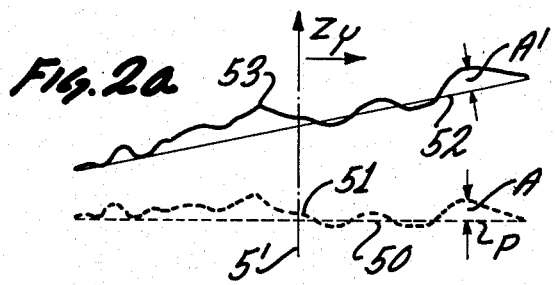
FIGS. 2a and 2b are schematic representations of cross sections through modulated and unmodulated wave fronts, for illustrating different types of distortions as may occur.
Figure 2B:
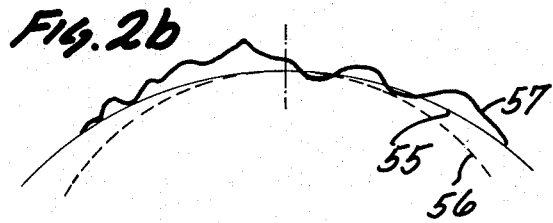

FIGS. 2a and 2b shows representative examples of distortions to be detected and eliminated. It is assumed that beam 5 is to arrive along a particular axis 5', being the optical axis of the detection equipment 6. The horizontal, dashed line 50 in FIG. 2a represents a wave front which is assumed to be unmodulated and undisturbed. The wave front is taken in a plane at exactly right angles to the optical axis 5' of unit 6. The dotted line 51 represents a wave front modulation resulting, for example, from the interaction with object 4.

The fully drawn, straight line 52 in FIG. 2a represents a tilted, unmodulated wave front resulting from a bending of beam 2,5 along its transmission path. The tilt can be defined as the angle (or a trigonometric function of that angle) between lines 50 and 52. The contoured, solidly drawn line 53 represents the same modulation pattern as the dotted line 51, but having been subjected also to the wave front tilt. Line 53, thus, represents a portion of the information as actually received in unit 6.

For the purpose of interpretation, it is reasonable to assume that wave front modulations of interest, and defined in forms of relative local propagation path length extensions and differences (i.e. OPD information), are measured (by device 6) with reference to a plane equivalent to the dashed line 50 in FIG. 2a. At any point P, such a wave front modulation (line 51) is given by a path length extension A. Due to the tilt, one will detect instead an exaggerated extension A', leading from the "baseline" (50) to a point on the curve (53) of detected wave front modulation. Elimination of the tilt can be interpreted, or carried, in two ways. Once, one might say that the undistorted, but tilted (or tipped) wave front is "folded down", to run again exactly transversely to axis 5' in order to coincide with line 50 in FIG. 2a.

Alternatively, one might say that the path length and phase of the wave front information is not measured relative to a plane conversely to axis 5', but to a tilted plane. These two interpretations are the equivalent of two approaches for correction. Redirecting the laser beam is, in fact, the equivalent of folding the (unmodulated) wave front planes into a detector plane at precisely right angles to the optical axis. The other interpretation does not necessarily require any physical tilting and redirecting of the beam, but could be carried out electronically by reducing (or increasing) any measured path length and wave front phase information (such as A') by a signal, representing the effect that a detected tilt has on the measuring result in any point in the measuring and detection plane such as point P for instance. The inventive system permits realization of either approach.

The tilt, as depicted in FIG. 2a, shows the wave front pivoted about an axis which is at right angles to the plane in the drawing of FIG. 2a. Conveniently, this direction may be identified by the x-axis of a coordinate system; the optical axis 5' would then run in (or parallel to) the z-axis of such a coordinate system; and the y-axis would extend orthogonally to both axes x and y, and run also in the plane of the drawing. Accordingly, a tip can be described as a pivoting of the wave front about the y-axis.

FIG. 2b represents the effect of "focus"; that is to say, beam 2, 5 has lost its true parallelism along its way, and the wave front is curved as shown either by solid line 55 or in a more pronounced case of "focus" as shown by dotted line 56. Line 57 represents the same phase and OPD information, which was identified by lines 51 and 52 in FIG. 2a; but FIG. 2b shows this information distorted on account of "focus". For the purpose of analysis, "focus" is assumed to be of spherical contour.

Figure 2C:
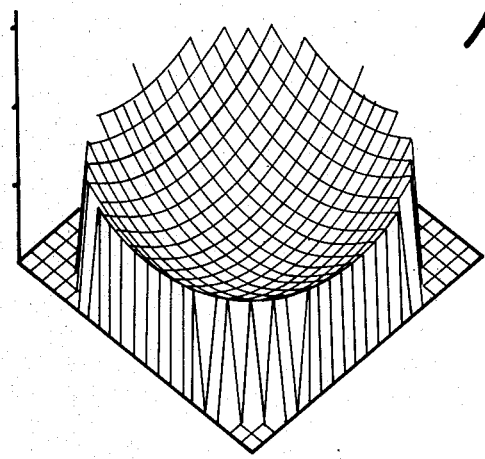
FIGS. 2c, 2d and 2e are respectively computer-calculated and computer-drawn plots, respectively representing "focus" and two types of astigmatisms.

FIG. 2c is an isometric plot of a spherically distorted wave front. Depending upon the orientation of the "bulge" relative to the direction of the propagating light, "focus" can be convex or concave.

Figure 2D:
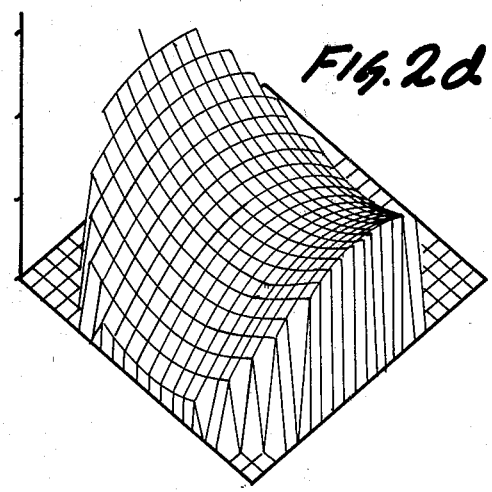
Figure 2E:
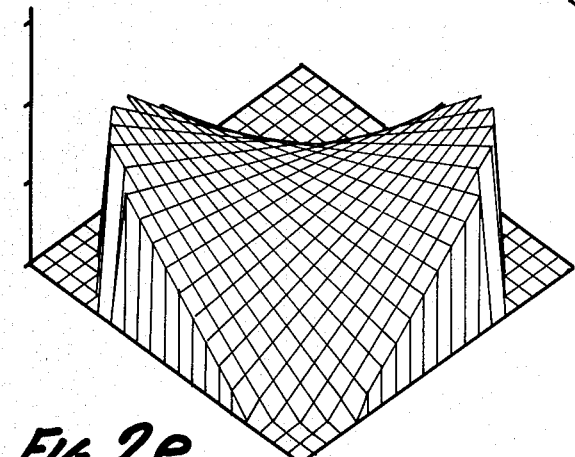

FIG. 2d is a similar type plot of a wave front which exhibits "astigmatism". This type of distortion will be called Astigmatism #1. The wave front bulges concavely in the x-z plane and convexly in the y-z plane. The same type of astigmatism could have a convex bulge in the a-z plane and a concave bulge in the y-z plane. Decisive is that the direction of bulging is opposite in these two planes.

Type 2e is a plot representing Astigmatism #2. Opposite bulging occurs here in two orthogonal planes which are rotated by 45° to the planes for determining Astigmatism #1. The initial choice of the orientation of the x, y and z coordinate directions was arbitrary. Thus, there is no particular connotation to the numbering of the two astigmatisms. In reality, both types of astigmatisms will occur, which is to say, the plane of maximum convex bulging and the plane of maximum concave bulging of the wave front are located at some in between orientation. Either type of astigmatism is already a fairly high-order, low-magnitude type of distortion. Distortions affecting only portions of the beam are of a still higher order and lower magnitude and are thus not very noticeable and can be disregarded.

On the basis of the foregoing, it can now be said that it is the purpose of the invention to obtain information of the tilt and tip angles (FIG. 2a) and of the parameters defining the sphere of "focus" and of the "astigmatisms" (FIG. 2b), and possibly of higher order aberrations.

FIG. 3 illustrates a portion of laser beam 5 on an enlarged scale and as it returns from interaction with an object (4 of FIG. 1). The beam's tapping point 7 is represented by a semitransparent mirror 10, which may actually permit most of beam 5 to pass and does divert (reflect) only a small portion 5a into detection equipment 8 for quantitatively determining wave front distortions other than the wanted information modulations. This equipment 8 includes a lens or lens system 11, having an optical axis 11'. The branched-off laser beam 5a is supposed to be a beam of parallel rays, and the focusing of beam 5a is to be effective in a particular focal location 12 of lens system 11. For the reason of aberration, focusing is never complete. For the purpose of facilitating explanation, it is assumed that an analogous x-y-z coordinate system is superposed upon the equipment in that the z-axis runs in the beam's axis, and an x-y plane can be defined in the focal plane.

FIG. 3a depicts the intensity (trace 60) along any line in that focal plane taken, for example, in the direction x. The curve includes a pronounced peak and secondary lobes to either side. Broadly speaking, trace 60 is the point-spread function taken along any diameter line in the focal plane and through the point in which axis 11' traverses that plane. It should be noted that the lens or lens system 11 is positioned in such a way that its optical axis can coincide with the optical axis of beam 5a if there is no distortion. The focus of the true focal point is not necessarily the center of the peak; but the effective point of focusing coincides with the centroid of the point-spread function. The peak center and spread-function centroid coincide only in the case of symmetrical aberration.

In the case of a tip of the wave fronts, the peak intensity as well as the centroid of the beam as focused by lens 11 in plane 12, will shift e.g. into a position shown in a dotted line 61 in FIG. 3a. In the case of a tilt, the peak and centroid would shift in the orthogonal direction. In the case of a "focus", the peak widens as shown in FIG. 3b. If it is a true focus, widening will be uniform in any direction in the focal plane. Trace 63 depicts the point-spread function for a less pronounced "focus". If astigmatism #1, #2, or both, are superposed upon "focus", the point-spread function is spread differently in different directions in the x-y plane.

FIG. 4 illustrates zone 12 and, in particular, the focal area on a still further enlarged scale. A detector array 15 is disposed a little downstream from the focal area 12 and in the portion of beam 5 (deemed distortion free), in which it begins to diverge again. Alternatively, the array 15 could be disposed upstream from the focal area 12. The array should not be disposed in the focal area 12 for reasons described more fully elsewhere.

Figure 5:
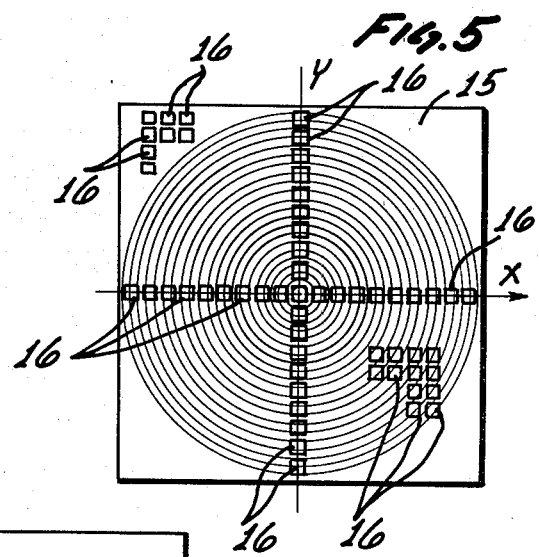

The detector array 15 is, for example, composed of an array of detector elements 16 which could be array charge-coupled devices (see FIG. 5). The detector array is disposed so that in the case of an undistorted beam, the radiation intensity pattern, as picked up, is exactly the same for both detectors. That is to say, in any diagonal direction of either detection plane, the effective radiation distribution and point-spread function have the same contour, e.g., like trace 60 in FIG. 3a.

Figure 6:
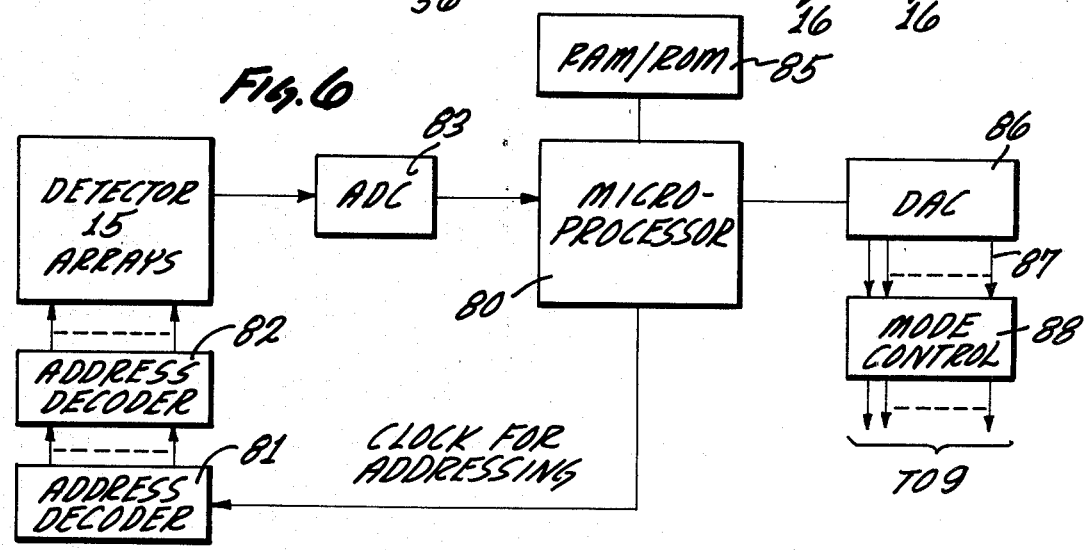
FIG. 6 is a block diagram of a system for processing the signals from the detectors shown in FIGS. 4, 4a and 5.

The individual devices 16 of the array are individually addressable; and each addressed cell feeds its output to a common output line. As shown in FIG. 6, the cells 16 of array 15 are addressed by means of an address counter 81, whose output stages are connected to an address decoder 82; counter 81 is preferably a ring counter for addressing the various cells in the arrays in a predetermined sequence. This mode of operation is convenient, but not essential. The addresses may well be furnished in accordance with a different address scheme, based on an algorithm which takes into account how the information is subsequently processed.

Counter 81, if it is a ring counter, may receive pulses from a clock, from a microprocessor 80, or from a clock which is also used by the processor.

The analogue detection and output signals of the detectors 16 are fed to an analogue-to-digital converter 83, having its analogue input connected to the common output line of the detector arrays. The converter feeds digital outputs to microprocessor 80 for storage in its memory section 85, commensurate with the detection-cell-addressing operation.

In accordance with a program which may be stored in a ROM, PROM, or RAM of memory section 85, processor 80 generates the several moments of the point-spread functions as detected along the x- and y-axes. The generation of these moments will be described next. Let x be the coordinate value identifying the location of a detector cell 16 on the x-axis; y be the coordinate value identifying the location of the cell on the y-axis; and $I_{x,y}$ be the intensity of radiation as detected by the cell having coordinate position x, y, and it appears that a first-order moment defining tilt is given by:

$$\frac{\Sigma I_{x,y} x}{\Sigma I_{x,y}} = \bar{x}$$

wherein each sum covers all cells of the array. This, of course, assumes that the cell-identifying numbers can be interpreted as x-scale values and are directly proportional to a distance value from a given point, conceivably the center of the array 15. Thus, the center of the array is x=y=0, and the coordinate values have, of course, positive and negative values. Under that assumption, $\bar{x}=0$ represents zero tilt, and a non-zero value for $\bar{x}$ represents the tilt angle. In either base, the value $\bar{x}$ defines a point on the x-axis which is the location of the centroid of the point-spread function. Analogously, $$\frac{\Sigma I_{x,y} Y}{\Sigma I_{x,y}} = \bar{Y}$$

represents the tip first order moment. If, as a result of the performed calculation, $\bar{y}$ equals zero, then there is a zero tip. Together, $\bar{x}$ and $\bar{y}$ give the coordinate of the centroid of the point-spread function in the x-y detection plane.

It should be noted that tip and tilt could be determined less accurately by just determining the location of the center peak rather than of the centroid of the point-spread function; but in some cases, this is not accurate or can even be impossible. Focus F is given by:

$$F_1 = \frac{\Sigma I_{x,y}[(x - \bar{x})^2 + (y - \bar{y})^2]}{\Sigma I_{x,y}}$$

Astigmatism #1 is given by the relation:

$$A_1 = \frac{\Sigma I_{x,y}\left(\frac{x-\bar{x}}{y-\bar{y}}\right)^2}{\Sigma I_{x,y}}$$

Astigmatism #2 is given by the relation:

$$A_2 = \frac{\Sigma I_{x,y}\left(\frac{x-y-\bar{x}+\bar{y}}{x-\bar{x}+y-\bar{y}}\right)^2}{\Sigma I_{x,y}}$$

These second-order moments indicate how far the intensity, as per the spread function, is actually spread or smeared in relation to the centroid. For a true focusing in a single point, these moments would have a certain fixed value.

It can thus be seen that the moments $\bar{x}$, $\bar{y}$, F, $A_1$ and $A_2$ constitute calculated values which have been acquired by processing the output of the cells as defined. $\bar{x}$ and $\bar{y}$ represent the dislocation of the radiation centroid from the array center, and F, $A_1$ and $A_2$ represent deviations of the spread function from ideal focussing or astigmatic correction.

In order to determine tip, tilt, focus and the astigmatisms, the array 15 could be placed in the focal area 12. However, an off position as shown is needed to actually determine "focus" and "astigmatism" because the moment F as calculated is ambiguous. The focus effect could be a convex one, or be concave! As outlined above, the value F represents, so to speak, directly the thickness of the spread function (FIGS. 3a and 3b). This F value will always be non-zero, even if focusing were ideal and aberration-free. Thus F is always a non-zero value. True focus is thus detected by the difference between an $F_{ref}$, generated by means of an ideal planar wave front, and a measured value F. The sign of the difference $F-F_{ref}$ represents the value of the spherical wave front aberration, as will be explained next.

Analogously, a wave front free from astigmatism will yield values from $A_1$ and $A_2$ which are non-zero. These values can also be ascertained on calibration and are reference values $A_{1ref}$ and $A_{2ref}$. Thus, true astigmatism will be represented by the two values $A_1-A_{1ref}$ and $A_2-A_{2ref}$.

The effect of "focus" was represented above and by way of example with reference to FIG. 2b, showing the center of the wave front advanced relatively to the fringe areas. A different sign of focus exhibits an opposite curvature which is noticeable as a relatively lagging central wave front portion. In one instance, beam 5a (FIGS. 3, 4) will be focussed more downstream from area 12 of normal focussing of planar wave fronts; and in the other instance, focussing occurs farther upstream. If the detection array were located in area 12, "focus" merely as detected by a peak spread could not distinguish among the two cases. Since the array 15 is placed downstream from focal zone 12, it also detects the sign of focus, because displacement of the beam's focus upstream from area 12 contracts the spread function and, in particular, its peak; a displacement of the beam's focus in downstream direction expands the spread function and its peak. Thus, focus is detected by a decrease or an increase in F, i.e., in the "thickness" of the point-spread function, over the value $F_{ref}$.

A problem may arise if the focal point displacement along the axis is too large. If the focal point is actually displaced so as to be located behind array 15, the dynamics of changes in the point-spread function is reversed. Moreover, if the displacement is very large, the sign of the value $F-F_{ref}$ may actually reverse. Thus, in order to increase the dynamic range, an arrangement should be used as shown in FIG. 4a. The array 15 is provided as before, but a beam splitter 17 intercepts beam 5a ahead of the focal zone and branches off a second beam 5a''. Accordingly, a reflected focal zone 12' exists for this reflected beam 5a''. Beam 5a' intercepted by a second detector 15' which is a duplicate of detector 15, but is disposed ahead, i.e. upstream, of the focal zone 12'. In view of the off-focus disposition of the two detector arrays 15 and 15', neither senses (normally) maximum focal beam contraction. If we again assume that trace 60 in FIG. 3c depicts the ideal intensity distribution (for undistorted beams) in the focal area (12) and across any diameter in the focal plane, then the intensity distribution and point-spread function along any diameter, but in any of the two detection planes, has a slighty broadened peak and correspondingly outwardly displaced side lobes. However, the contours will qualitatively still look like trace 60. On the other hand, the amplitudes may differ, e.g., on account of a beam-splitting other than 50% for each branch. For the purpose of practicing the invention, an accurate 50% splitting is not needed because the detection of the laser beam distortion does not depend upon any comparison of the intensities in the two branches. The second array 15' permits both of them to be placed quite close to the focal areas 12, 12' and the ambiguity above can still be resolved much better.

In the case of small focal point displacements from the focal area 12, the spread function and its peak as detected by one array appears contracted; and the spread function and its peak as detected by the other array appears expanded. Thus, the sign of the difference such as:

$F_{15} - F_{15'}$ is a direct indication of a convex or concave "focus". This remains true even for large focal displacements. For a small dynamic range one does not need a reference value, thus $F_{15}-F_{15'}$ is directly indicative of focus. For the enlarged range, reference values are needed.

The various values calculated by processor 30 can readily be used as control signals for controlling an adjustable portion of the optic as per FIG. 1. As shown schematically in FIG. 6, the various digital values for $\bar{x}$, $\bar{y}$, F, $A_1$ and $A_2$ under inclusion of the predetermined (and stored) reference values are sequentially produced by processor 80 and fed to a digital-to-analog converter 86, whose analog outputs are placed in different channels 87, to be held in analog storage device 88 as analog outputs for the moments, until updated.

The detection and calculating process can be run on a cyclic basis and is limited in time only by the speed of scanning the detection cells and the calculations. The cycle time may well be in the kilohertz range, so that the bandwidth for detecting time variant distortions is in the same range.

The moment signals now stored in and made available by unit 88 represent directly the modes of the wave front in accordance with e.g., a Zernicke decomposition. These mode signals are fed to the control unit 9 which can be interpreted as an output device of the processing facility of FIG. 6; unit 9, thus, receives analog values representing the moments $\bar{x}$, $\bar{y}$, $F-F_{ref}$, $A_1-A_{1ref}$ and $A_2-A_{2ref}$. These values are applied to suitable control elements for operating adjustable optical elements in unit 3.

FIG. 7 illustrates a unit 91 which amplifies the mode signal represented by tilt-moment $\bar{x}$, to operate a drive 36 for tilting a mirror 35, to redirect laser beam 2, commensurate with a "straightening" of the tilted wave front as detected by the apparatus described. An analog control responds to the tip moment $\bar{y}$ and redirects the beam in a direction orthogonal to the plane of the drawing.

Another amplified unit 92 receives the moment representing focus $F-F_{ref}$. This signal is duly amplified and fed to a drive-stage 33 for moving a convex mirror 32 towards or away from a concave mirror 31. The latter mirror, or reflector, has an aperture for receiving the laser beam as a parallel beam; and the mirror assembly 31/32 is provided to superpose a diverging, or a converging, component upon the beam, just sufficient enough to eliminate the curvature of the wave front as received (FIG. 1), corresponding to "focus." The distinction between the need for a diverging or a converging component is made by operation of the calculation determining the sign of the difference as between the values for "focus" calculated separately for the two arrays 15 and 15'.

Figure 8:
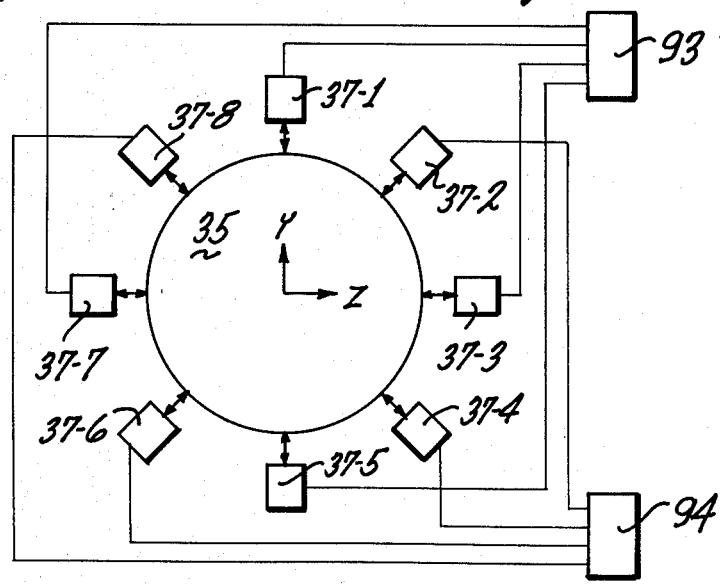
FIG. 8 is a schematic illustration supplementing the control shown in FIG. 7, particularly for eliminating astigmatisms.

FIG. 8 illustrates schematically how astigmatism can be avoided. The mirror 35 is subjected to a warping type of distortion by means of tension/compression devices 37-1 through 37-8, wherein the devices with odd subscripts receive signals indicative of Astigmatism #1 and devices with even subscripts receive signals indicative of Astigmatism #2. Devices being disposed opposite to each other receive similar signals; devices at right angles, therefore, receive the same signal but at opposite polarity. Both signals are, of course, proportionate to $A_1-A_{1ref}$ and $A_2-A_{2ref}$. Units 93 and 94 respectively receive these signals from the processor and convert them into the proper control signals for the devices 37-1 through 37-8. Accordingly, one or more wraps are imparted upon reflector 35 in order to distort the reflector convexly or concavely and in the different planes to eliminate the astigmatisms in the returned beam. Further details of this control are incidental, decisive is the real-time generation of the moment signal for the purpose of control.

The particular mode and manner of controlling the beam depends on the purpose and use of the beam and on the degree of accuracy desired. Focus and astigmatism could also be corrected by means of a single concave mirror, such as concave mirror 31 (mirror 32 being stationary), and by distorting the surface locally through suitable transducers for changing parallelism to divergence or convergence of the outgoing beam, but to different degrees in different planes.

The advantage of the system is to be seen in the fact that by determining the linear and second-order moments of the point-spread function of a focussed beam, one obtains five analog values which represent directly the first- and second-order modes or terms of a polynominal, describing the most prevalent wave front distortions of a received laser beam; and these values can be used directly in a closed-loop system for removing the distortion.

The ambiguity, which exists concerning "focus" if a single array 15 of the detector cells were used directly in the focal area or zone 12, could be resolved by a dithering method provided, of course, the distortions to be corrected have much smaller frequencies than the dithering frequency. The detector array 15 will be displaced periodically along optical axis 11'. If the second-order moment F increases as the array is displaced upstream as well as downstream from the focal plane in zone 12, the wave front would be planar; if F increases more downstream than upstream, or even decreases, then "focus" is present, being the result of a convex contour of the wave front as seen along the axis toward lens 11; for the reverse situation, "focus" is a concave wave front.

The invention is not limited to the embodiments described above; but all changes and modifications thereof, not constituting departures from the spirit and scope of the invention, are intended to be included.

I claim:

1. In a system which uses a point light source or laser emitting a beam for the purposes of interaction with an object, or of transmission, an apparatus for determining unwanted wavefront distortions, comprising:
   means for intercepting said beam for branching off a portion of the beam and deflecting it into a particular path which includes an axis;
   means disposed for intercepting the branched-off beam and focusing the entire branched-off beam into a single particular zone along the axis;
   means disposed in, or in the vicinity of, the particular zone for detecting a representation of a point-spread function of the focused beam and its distribution in a particular plane transversely to the axis; and
   means connected to the means for detecting, for generating signals representing moments of the spread function, those moments being representative of the value of the aberration coefficients of the unwanted wavefront distortions, including tip, tilt, focus, and both astigmatisms.

2. In a system as in claim 1, and including means connected to be responsive to said generated signals for modifying the beam for reducing or eliminating wave front distortions represented by said relative spreading and centroid displacement.

3. In a system which uses a point light source or laser emitting a beam for the purpose of interaction with an object or for the purpose of long-range transmission, an apparatus for determining unwanted wavefront distortions, comprising:
   means for intercepting said beam for branching off a portion of the beam and deflecting the entire branched-off portion into a single particular path which includes an axis;
   means disposed for intercepting the branched-off beam and focusing the beam into a particular zone along the axis;
   a detector array disposed in a plane on or near said zone and including at least a plurality of radiation detectors arranged in a first direction in the plane and a plurality of radiation detectors arranged in a second direction in the plane;
   means connected to the detectors of the array for receiving signals representing radiation intensity as detected by the respective detectors; and
   means connected to provide signals, representing a relative location of the centroids of the intensities along, respectively, the first and second directions in the plane and the respective width of intensity spreading in the first and second directions and at 45° to the first and second directions, said signal means also summing and comparing said moments to produce a measure of the aberration coefficients of tip, tilt, focus, and both astigmatisms.

4. In a system which uses a point light source or laser, emitting a beam for the purpose of interaction with an object or for the purpose of long-range transmission, and to be received by a receiver means, an apparatus for reducing or eliminating unwanted wavefront distortions as effective in the receiver means, comprising:
   means for intercepting said beam for branching off a portion of the beam and deflecting the entire branched-off portion into a single particular path which includes an axis;
   a detector array disposed in a plane in or near said zone and including at least a plurality of radiation detectors arranged in a first direction in the plane and a plurality of radiation detectors arranged in a second direction in the plane, for detecting representations of a point-spread function of the focused beam along said first and second directions in said plane;
   means connected to the detectors to provide signals, representing the first-order and second-order moments of the point-spread function, separately, for the first and second directions and at 45° to the first and second directions, the first-order and second-order moments being compared to produce a measure of the aberration coefficients of tip, tilt, focus, and both astigmatisms; and
   means connected to the signal means for reducing, or even eliminating, the distortions as they would be effective in the receiver means.

5. In a system as in claim 4, including means for intercepting the branched-off beam and branching off a portion of the latter beam to obtain a second focal zone; a second detector array disposed near the second focal zone, whereby one of the detector arrays is disposed upstream and the other one downstream from the focal plane in the respective focal zone; said signal means connected to the second detector array and including circuit means for generating second-order moments of a point-spread function as detected by the second array.

6. In a system as in claim 4, the means for reducing or eliminating comprising a plurality of modal optical elements for separate control at each aberration.

7. In a system as in claim 4, 5, or 6, said signal means including processing means for calculating the said moments and generating signals for use by the means for reducing.

8. In a system which uses a point light source or laser emitting a beam for the purpose of interactions with an object, or for the purpose of transmission, an apparatus for determining unwanted wavefront distortions, comprising:
   means for intercepting said beam for branching off a portion of the beam and deflecting it into a particular path which includes an axis;
   means disposed for intercepting the branched-off beam and focusing the entire branched-off beam into a single particular zone along the axis;
   the beam as focused resulting in an intensity distribution in said zone in accordance with a point-spread function;
   a detector array including a plurality of detector cells and disposed in a plane near or in the zone, the cells being arranged along particular directions;
   circuit means connected to the cells of the array and receiving therefrom signals representing received radiation intensities; and
   means connected to receive the signals for processing the signals, providing a first-order moment and second-order moment of the point-spread function, the moments being representative of the aberration coefficients of tip, tilt, focus, and both astigmatisms.

9. In a system which uses a point light source or laser, emitting a beam for the purpose of interaction with an object or for the purpose of long-range transmission, and to be received by a receiver means, an apparatus for reducing or eliminating unwanted wavefront distortions as effective in the receiver means, comprising:
   means for intercepting said beam for branching off a portion of the beam and deflecting it into a particular path which includes an axis;
   means disposed for intercepting the branched-off beam and focusing the entire branched-off beam into a single particular zone along the axis;
   detector means disposed at least near the said focal zone for detecting a point-spread function of focused radiation, and at least along one line transversely to the axis;
   processing means connected to the detector means and generating signals, representing first- and second-order moments of the point-spread function as detected, including the aberration coefficients of tip, tilt, focus, and both astigmatisms; and
   means connected to the processing means for reducing the effect of unwanted distortions as effective in the receiver means.

10. In a system as in claim 9 and including additional means for determining separately whether the second-order moments represent a convex or a concave curve of the wave fronts.

11. A method of correcting the properties of a point light source laser beam, particularly as to the planarity or the wavefronts of the beam as received following emission thereof, comprising the steps of:
   deflecting a portion of said beam;
   focusing the entire deflected portion of the beam into a single particular zone;
   detecting at least one representation of the point-spread function of the focused beam in or near said zone;
   calculating first- and second-order moments of said point-spread function, the moments representing the aberration coefficients of tip, tilt, focus, and both astigmatisms, and generating signals representative thereof; and using said signals to correct the effect of wavefront distortions of the laser beam.

12. A method as in claim 11, and including the step of branching off the portion of the beam from the laser beam as returned following interaction with an object, with another beam or following long-range transmission.

13. A method as in claim 12, wherein the using step includes redirecting the beam and modifying parallelism of the beam as emitted.

14. A method as in claim 11, including the step of separately detecting the direction of dislocation of the focal point of the beam portion, as focused, in axial direction.

15. In a system which uses a point light source or laser emitting a beam for purposes of transmitting the energy through a distorting medium or is distorted at the source, an apparatus for determining certain characteristics of the wavefront distortions, comprising:

means disposed to focus a portion of the beam branched-off, means disposed at or near the focal plane for detection of the distribution of the radiation in a plane transverse to the optical axis, and means connected to the output of the detection array to calculate certain moments of the radiation distributions which are found to be proportioned to the value of certain aberration coefficients of the wavefront distortions.

16. In a system which uses a point source of light or a laser emitting a beam, whose phase front is distorted or becomes distorted by means of propagation through a turbulent media, an apparatus for determining certain of the wavefront distortions, comprising;

means disposed for focusing a portion of the beam branched-off for detection purposes;

a detector array disposed in a plane at or near the focal spot of the lens, which individual detectors located in a two dimensional array in a plane perpendicular to the optical axis;

means connected to the detectors in the array for receiving the detector signals representing the light intensities at the various detector locations;

first circuit means connected to provide signals representing the relative locations of the centroid of the intensity pattern in both transverse directions in the plane;

second circuit means connected to provide a signal proportional to the radial spreading of the intensity pattern;

third circuit means connected to provide signals proportional to the relative spreading between the 0° and 90° axis, and the relative spreading between the 45° and 135° axis; and means for proportioning these signals which are proportional to the aberration coefficients of tip, tilt, focus and 0° and 45° astigmatism.

* * * * *

UNITED STATES PATENT AND TRADEMARK OFFICE
CERTIFICATE OF CORRECTION

PATENT NO. : 4,344,707
DATED : Aug. 17, 1982
INVENTOR(S) : Norbert A. Massie

It is certified that error appears in the above-identified patent and that said Letters Patent are hereby corrected as shown below:

Column 12, line 57, delete the word "on" and insert therefor --in--.

Signed and Sealed this

Fifteenth Day of February 1983

[SEAL]

Attest:

GERALD J. MOSSINGHOFF

Attesting Officer

Commissioner of Patents and Trademarks